R. G. WOODWARD.
THREAD CONTROLLING MECHANISM FOR SEWING MACHINES.
APPLICATION FILED MAR. 28, 1907.

1,143,010.

Patented June 15, 1915.
7 SHEETS—SHEET 6.

Witnesses
C. H. Bindine
Grace P. Brereton

Inventor
Russel G. Woodward
By Sturtevant & Mason
Attorneys

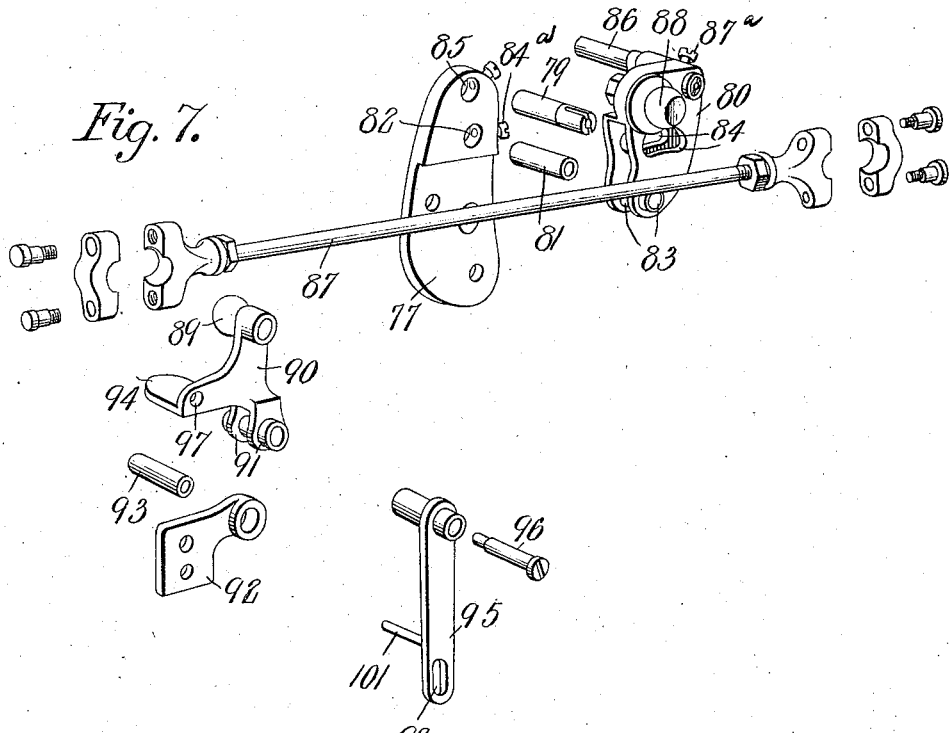# R. G. WOODWARD.
THREAD CONTROLLING MECHANISM FOR SEWING MACHINES.
APPLICATION FILED MAR. 28, 1907.
1,143,010. Patented June 15, 1915.
7 SHEETS—SHEET 7.

UNITED STATES PATENT OFFICE.

RUSSEL G. WOODWARD, OF WAUKEGAN, ILLINOIS, ASSIGNOR TO UNION SPECIAL MACHINE COMPANY, OF CHICAGO, ILLINOIS, A CORPORATION OF ILLINOIS.

THREAD-CONTROLLING MECHANISM FOR SEWING-MACHINES.

1,143,010.     Specification of Letters Patent.     Patented June 15, 1915.

Application filed March 28, 1907. Serial No. 364,993.

*To all whom it may concern:*

Be it known that I, RUSSEL G. WOODWARD, a citizen of the United States, residing at Waukegan, in the county of Lake, State of Illinois, have invented certain new and useful Improvements in Thread - Controlling Mechanisms for Sewing-Machines, of which the following is a description, reference being had to the accompanying drawing and to the letters and figures of reference marked thereon.

My invention relates to new and useful improvements in thread controlling mechanisms for sewing machines, and while said mechanism is more especially adapted for chain stitch sewing machines operating upon leather and other heavy materials, it is apparent that said mechanism may be used in connection with other types of machines where it is desired to automatically control the supply of thread for the stitching mechanism and also to automatically control the formation of the stitch.

An object of my invention is to provide mechanism for pulling thread from the supply, which shall be automatically controlled in its operation so as to draw from the supply varying amounts of thread in accordance with the thickness of material operated upon.

A further object of my invention is to provide mechanism for drawing up the loops of needle thread underneath the material which shall be automatically controlled so as to draw the loop to a definite position relative to the under surface of the material regardless of the thickness of the material operated upon.

A further object of my invention is to combine automatic mechanism for pulling various lengths of threads from the supply so as to automatically control the supply of thread for different thicknesses of material with automatic mechanism for controlling the needle thread underneath the material so that the position of the needle loop when the stitch is set, may be the same regardless of the thickness of the material.

These and other objects of my invention will in part be obvious and will in part be more fully described hereinafter.

My invention consists in the novel parts, arrangements and improvements hereinafter shown and described.

Figure 1:
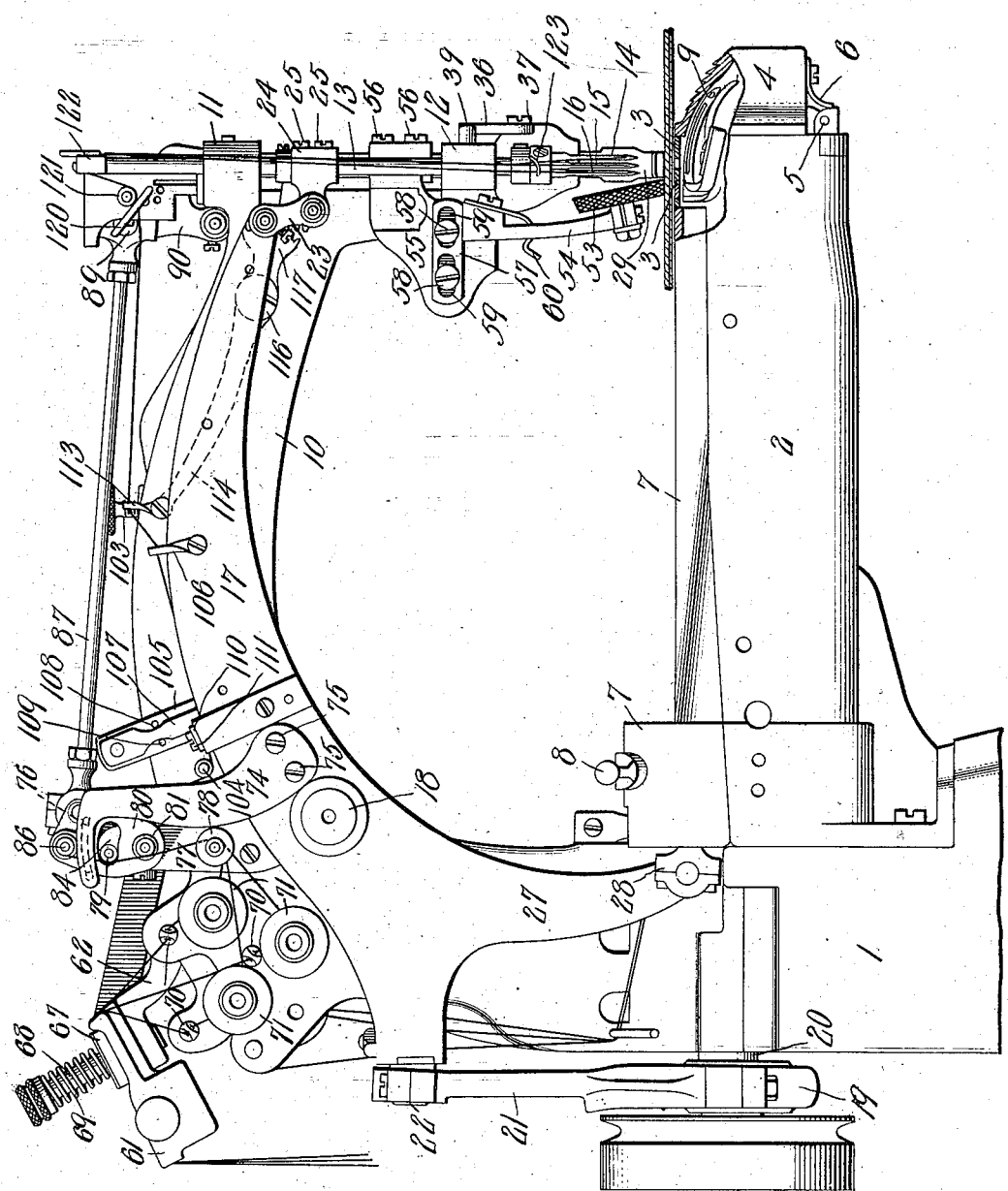
Figure 2:
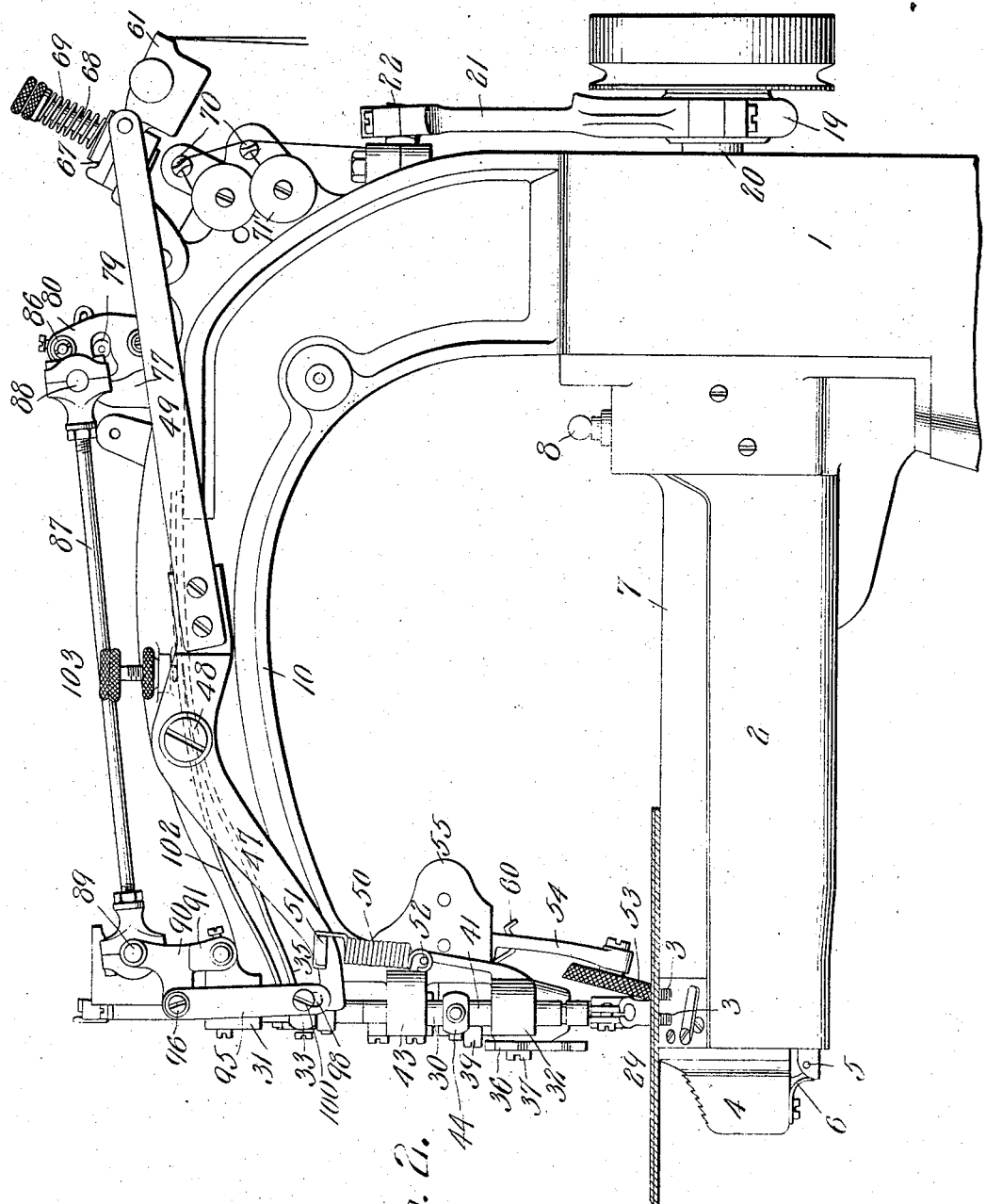
Figure 3:
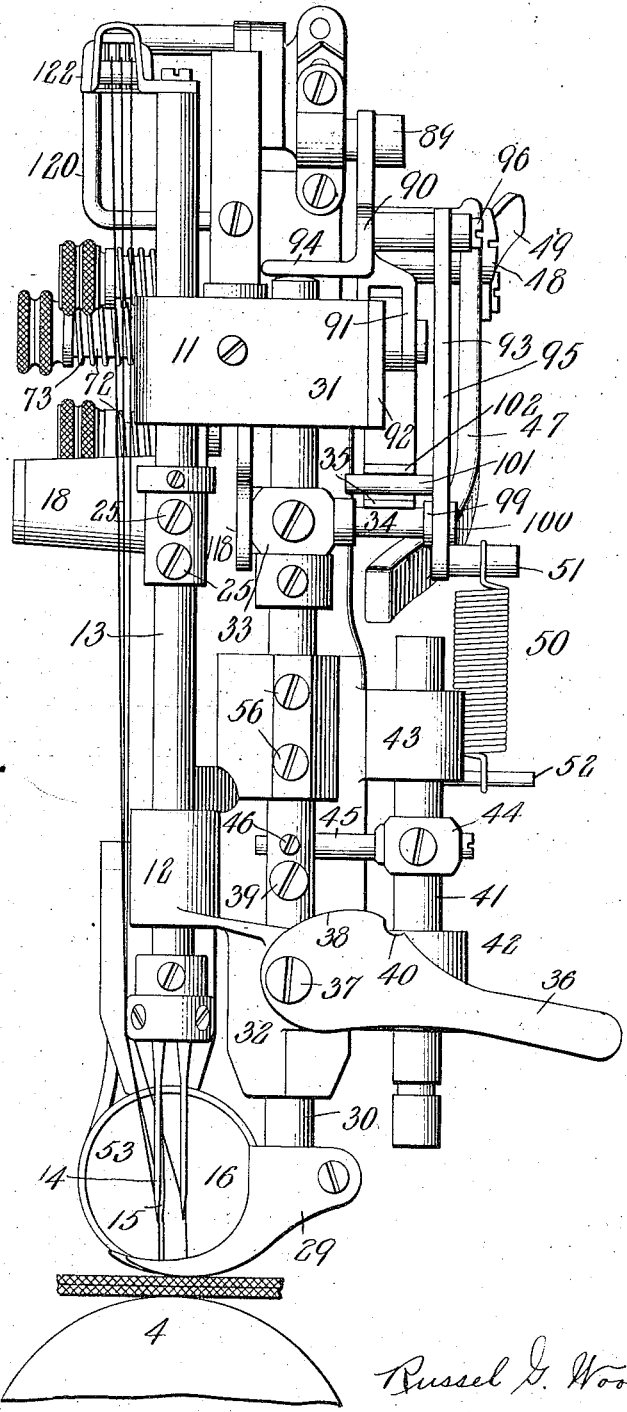
Figure 4:
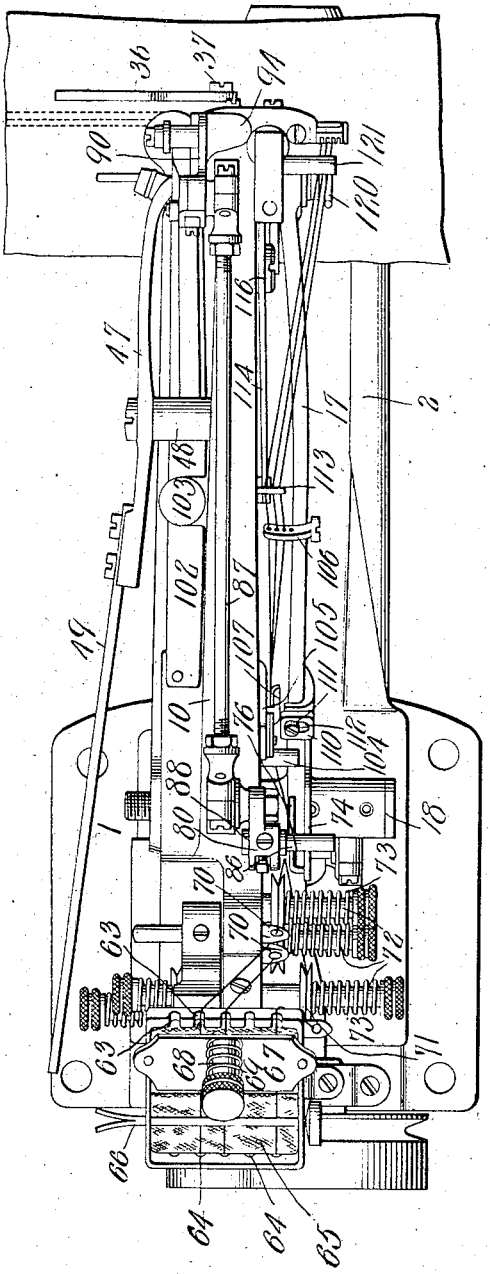
Figure 5:
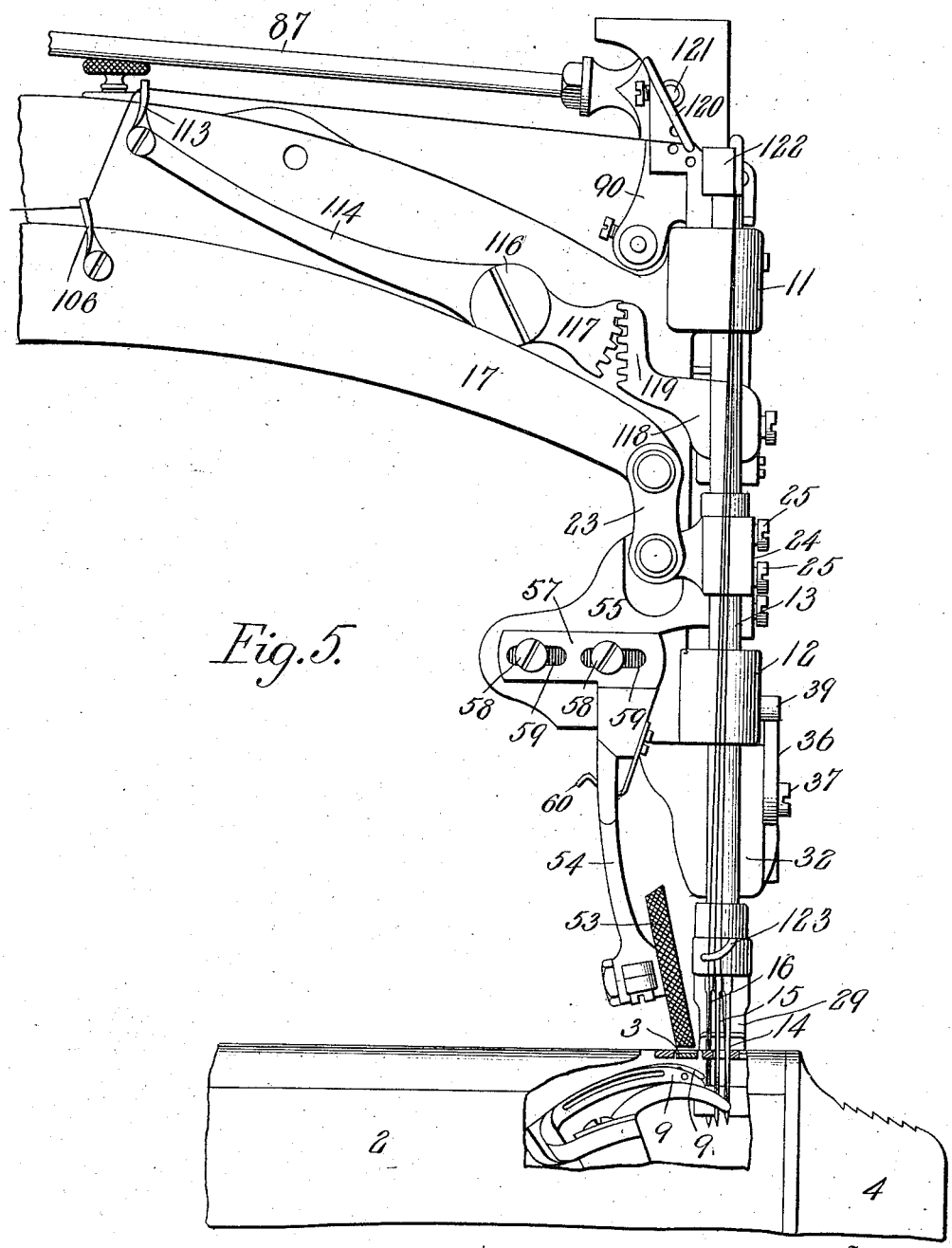
Figure 6:
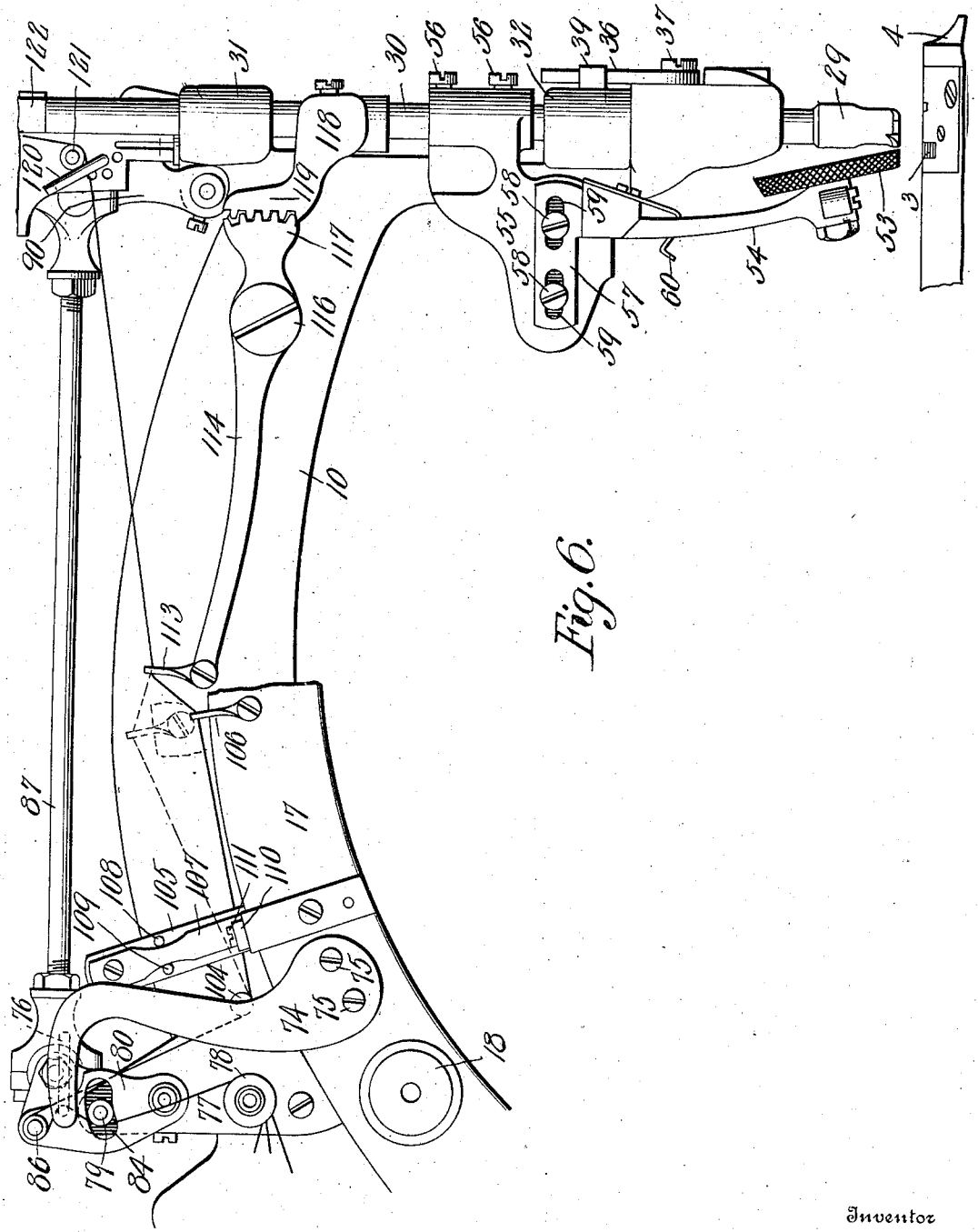

In the accompanying drawings which show one embodiment of the preferred form of my invention:—Figure 1 is a front side elevation showing a sewing machine with my improvements applied thereto. Fig. 2 is a rear side elevation of the parts shown in Fig. 1. Fig. 3 is an end elevation of the same. Fig. 4 is a top plan view of the same. Fig. 5 is an enlarged side elevation of the forward end of the machine showing the needles in their extreme lower positions. Fig. 6 is a side elevation of the upper front end portion of the machine with certain parts broken away in order to show more clearly the thread controlling mechanism. Fig. 7 is a detail separated perspective view of a portion of the mechanism operated by the presser bar for controlling the position of the thread guides for different thicknesses of material. Fig. 8 is a detail view in front elevation of the pull off mechanism showing in dotted lines the movement of the thread guide for different thicknesses of material. Fig. 9 is a detail perspective view of the thread pulling arm viewed from the rear side.

In the drawings the base plate 1 has extending therefrom a cylindrical work support 2, although it is apparent that any other form of work support may be substituted for that herein shown, without departing from the spirit of my invention. Located within the work support 2, is a feeding mechanism for moving the material which carries the usual feed dogs 3, 3 operating through slots in the forward end of the work support. Said work support has the front portion 4, thereof hinged as at 5, so that the same may be turned down for the purpose of giving access to the looper in threading. This member 4 is held in its closed position or in its open position by means of a spring 6 shown in Figs. 1 and 2. The top portion of the work support 7 may be detachable so as to give access to the operating parts within the work support. This detachable portion 7 is held in place by a pivoted catch 8.

The loopers 9, 9 shown in Figs. 1 and 5 are of the usual thread carrying type, and are mounted for oscillation within the forward end of the work support. It is obvious that any other form of thread carrying looper may be used in connection with my invention and therefore the construction of the looper mechanism will not be further described.

Rising from the base plate 1, is an overhanging arm 10, on which is mounted the needle operating mechanism and my improved thread controlling mechanism. At the forward end of the overhanging arm 10, are suitable bearings 11, and 12 in which reciprocate a needle bar 13. In the present embodiment of my invention said needle bar is shown as provided with three needles 14, 15 and 16. The needles 14 and 15 are arranged substantially in line and at right angles with the line of feed while the needle 16 is arranged slightly in rear of the other needles. The forward looper as shown in Figs. 1 and 5 coöperates with both of the needles 14 and 15, while the rear looper shown in these views coöperates with the needle 16. Each needle is provided with a separate thread and my improved thread controlling mechanism operates independently upon each thread. It will be apparent therefore, that said improved thread controlling mechanism is adapted for use in connection with a single needle machine and for the sake of clearness in the further description of my improvement a single needle and looper will be referred to, it being understood that any number of needles may be used instead of said single needle.

The needle bar receives its reciprocation from the needle lever 17 which is pivoted at 18 upon the overhanging arm and receives its oscillation from an eccentric 19, upon the main shaft 20, through a link 21. The link 21 has a ball stud connection 22 with the needle lever 17. The forward end of the needle lever 17 is connected to the needle bar by a link 23 and a lug 24, which is adjustably connected to the needle bar by means of screws 25, 25. The needle lever 17 is provided with the usual needle lever extension 27, with which is connected a link 28, for oscillating the loopers 9.

Coöperating with the work support 2 and the feed dogs 3 is a presser foot 29. Said presser foot 29 is carried by the presser bar 30 which may be reciprocated in suitable bearings 31 carried by the overhanging arm 10 of the machine. Mounted on said presser bar, is a collar 33 which is provided with a stud 34, against the upper surface of which a leaf spring 35 carried by the overhanging arm 10, bears. The purpose of this spring is to hold the presser foot firmly upon the material passing through the machine. Said presser foot is provided with suitable needle openings for the passage of the needles.

As one means for lifting the presser bar, I have provided a lever 36 pivoted at 37 to the lug 32. Said lever 36 has a cam surface 38 which may be brought into contact with a pin 39 carried by the presser bar 30. Said lever has a slight depression or seat 40, receiving the pin 39 so that when said lever is turned to lift the presser bar the pin will drop into said seat and the presser bar retained in its raised position. In order to guide the presser bar in its movements and to prevent the lateral movements of the foot, I have provided a guide rod 41 which reciprocates in lugs 42, 43, and has a collar 44 carrying a stud 45 which passes through the presser bar 30 and is held therein by a set screw 46. As an additional means for raising the presser foot, I have provided a lever 47 shown in Figs. 2 and 3. Said lever is pivoted at 48 to the overhanging arm 10 and has its forward end deflected downwardly and inwardly underneath the stud 34. The rear portion of the lever 47 is provided with an arm 49 which is suitably connected to a needle lever or foot treadle, whereby said lever may be operated to raise the presser bar. A suitable spring 50 connected to a lug 51 on the lever 47 and to a pin 52 on the head of the machine, serves to depress the forward end of the lever and to normally hold the same out of contact with the stud 34.

I have also provided my machine with an auxiliary presser roller 53, which is pivotally supported at the lower end of an arm 54 carried by a bracket 55 secured to the presser bar 30 by screws 56, 56 as best shown in Fig. 6. Said arm 54 is pivotally connected to a supporting plate 57 which is adjustably connected to the bracket 55 by means of screws and slots 58, 59. The arm 54 is held in its normal position adjacent the presser foot by means of a spring 60. It will be noted that the auxiliary roller presser foot being carried by the presser bar is raised and lowered automatically with the presser foot.

The needle threads as they pass from the supply to the machine pass through an oil box 61 secured to a bracket 62 at the rear of the machine. Said oil box is provided with thread guide slots 63, 63 at the forward side and with thread guide openings 64, 64 at the rear side. Said oil box is also provided with an oil pad 65. A rod 66 passes through the oil box and the needle threads passing underneath said rod are held in contact with the oil pad 65. At the front side of the oil box is a plate 67 mounted on a stud 68. Said plate 67 is yieldingly held against a stripper pad by means of a spring 69.

After the needle threads leave the oil box, the same pass through suitable thread guides 70 and then through suitable tension disks 71. Said tension disks are mounted upon studs 72 and are yieldingly held in contact by a spring 73.

After the threads leave the tension disks 70, the same pass through my improved pull off mechanism. Said mechanism consists of an arm 74 secured by suitable screws 75, 75 to the needle lever. Said arm extends upwardly from the needle lever and has a laterally extending portion carrying a thread engaging finger 76 as shown more clearly in Fig. 9 of the drawing. Said finger 76 extends outward from the arm 74 and is then bent laterally substantially parallel with the arm in order to provide means for retaining the thread or threads upon said finger.

A bracket 77 carried by the head of the machine extends upward to a position adjacent the outer end of the arm 74 and is provided with suitable thread guiding rolls which coöperate with the thread finger carried by the arm 74. Said bracket 77 is provided with a thread guiding roll 78 near its base and at its upper end is provided with another thread guiding roll 79. Pivoted to the upper end of the bracket 77 is a yoke 80 which extends along each side of the bracket 77 and is connected to said bracket by a pivoted rod 81 extending through an opening 82 in the bracket and corresponding openings 83 in the yoke. Said pivot rod is held in place by means of a suitable set screw 84ª. Both of the members of said yoke 80 are slotted as at 84, 84 and the guide roll 79 secured in the opening 85 of the bracket 78, projects through the forward slot in the yoke as shown in Figs. 1, 6 and 8.

It will be noted that the slot 84 is curved about the pivot of the yoke as a center so that said yoke is capable of limited oscillation upon its pivot. Projecting from the upper end of the yoke 80 is a thread roll 86 which is secured to the yoke by means of a set screw 87ª.

The thread rolls 79 and 86 are so located relative to the thread arm 74 that the thread finger, as the same oscillates back and forth with the needle lever moves in a path between the said thread rolls 79 and 86.

The thread after leaving the tension disks passes around the thread roll 78 and then over the thread rolls 79 and 86. Said thread as shown in Figs. 1, 6, and 8 passes to the left of the thread rolls 79 and 86 and to the right of the thread finger 76 so that as the thread finger is oscillated to the right of the thread rolls 79 and 86 the thread will be engaged by said finger and a certain pull upon the thread results. The amount of pull of the thread finger on the thread and the amount of thread pulled from the supply by this movement depends upon the distance said finger moves to the right of these thread rolls.

It will be noted from the above construction that the yoke 80 carrying the thread roll 86 may be swung on its pivot 81 and thus position the thread roll 86 relative to the thread roll 78 and the thread finger 76 so that the relative movement of said thread finger 76 to the right of the thread roll 86 and the thread passing over said thread roll 86 and thread roll 79 may be increased or decreased and thus the amount of thread pulled from the supply correspondingly increases or decreases. If the thread roll 86 be moved from the position shown in Fig. 6 to that shown in Figs. 1 and 8, it is obvious that the amount of thread pulled off by the thread finger 76 will be decreased as the movement of said finger 76 to the right of the thread roll 86 which is the thread drawing movement of said finger is less. It will be obvious that if the position of the yoke 80 be shifted as the thickness of the material varies the amount of thread drawn from the supply may be made to correspond with the thickness of the material.

As a means for shifting the yoke 80 by varying thicknesses of the material, I have connected said yoke to the presser bar so that as the presser bar is raised or lowered, as the material increases or decreases in thickness passing under the presser foot, said yoke will be shifted and the distance which said yoke is shifted will be determined by the thickness of the material. This means consists of a link 87 which is pivoted at 88 to the yoke 80 and at its opposite end at 89 to a rock lever 90. Said rock lever 90 is provided with spaced arms 91, 91 which are pivotally connected to a bracket 92 by means of a pivot stud 93. Said bracket 92 is secured by suitable screws to the head of the machine. The rock lever 90 has an extended lip 94 which extends over the presser bar 30 and normally rests on the upper end thereof. Said rock lever has also connected thereto a depending arm 95 which is connected thereto by a stud 96 passing through said arm and engaging an opening 97 in the rock lever. Said arm 95 is provided at its lower end with a slot 98, which engages the outer end of the stud 34 carried by the collar 33 on the presser bar 30. The outer end of said stud is slightly enlarged as at 99 and a suitable screw 100 passing through the slot 98 engages said enlarged end of the stud 34. This slotted connection between the arm 95 and the stud 34 serves as a suitable guide for the arm 95 and holds the same substantially in a vertical position. Said arm 95 is provided with a projecting pin 101 which extends inwardly substantially parallel with the stud 34. Bearing upon the pin 101 is a leaf spring 102 which is secured to the overhanging arm of the machine 10 in any suitable manner. The leaf springs 35 and 102 are connected to the same lug on the overhanging arm and are in contact for a short distance from their point of support. The spring 102 is then deflecetd upwardly and slightly spaced from the spring 35. An adjusting screw 103 passing through a lug on the overhanging arm contacts with the springs 35 and 102 and serves as a means for increasing or decreasing the tension on said springs.

The spring 102 is somewhat lighter than the spring 35. The primary object of the spring 102 is to retain the projecting lip 94 of the rock shaft 90 in contact with the upper end of the presser bar and the yoke 80 carrying the thread roll 86 in its forward position. It will be noted that this spring 102 also serves as an auxiliary spring in holding the presser foot upon the work support.

The operation of my improved mechanism for positioning the yoke 80 relative to the thread pulling finger will be obvious. When the material underneath the presser foot increases in thickness the presser bar is raised, thus oscillating the rock lever 90 and through the link 87 oscillating the yoke 80 upon its pivot, while on the other hand if the thickness of the material decreases, the springs 35 and 102 lower the presser bar and move the rock lever 90 in the opposite direction. This movement of the rock lever through the link 87 moves the yoke 80 and the thread roll carried thereby in the opposite direction. In order that the position of the yoke 80 for any given position of the presser foot may be varied, I have provided the link 87 with right and left hand threads so that by turning said link one way, or the other the position of the yoke relative to the rock lever 90 may be varied.

After the needle thread passes over the thread roll 86, said thread passes under a thread roll 104 on the arm of the machine and thence through the thread clamp 105 to a thread guide 106 on the needle lever. Said thread clamp 105 comprises a clamping plate which is secured to the arm of the machine and a yielding clamping finger 107, which is rigidly secured to the plate and has its free end extending downwardly over the clamp plate. Said spring finger is held from lateral movement by pins 108 and 109 carried by the supporting plate and extending outwardly each side of the clamping finger. The clamping finger is so shaped as to normally be held away from the supporting plate by the spring action of the said finger. Said clamping finger is brought into contact with the supporting plate to clamp the needle thread by means of a lug 110 which is adjustably secured to the needle lever by a screw 111, passing through a slot 112 in said plate. As the needle lever oscillates, the lug 110 is brought into clamping contact with the clamping finger 107 on the downward movement of the lever and as said lever moves upwardly, the lug is withdrawn from contact with said finger. By this means an intermittent clamping of the thread is secured. By adjusting the lug 110 the time when the same contacts with clamping finger 107 is varied, and thereby the time of operation of the thread clamp varied.

After the thread leaves the thread guide 106, carried by the needle bar, said thread passes through a thread guide 113 carried by an arm 114, pivoted at 116 to the overhanging arm of the machine. Said arm 114 extends beyond its pivot 116 and is provided with a toothed segment 117. The collar 33 on the presser bar 30 is provided with a bracket 118 which extends outwardly and carries a rack 119 which meshes with the toothed segment on the thread arm 114. It will be noted that the thread guide 113 being connected to the presser bar will move up and down as the thickness of the material underneath the presser foot varies. The purpose of this thread arm and its connection to the presser bar so that its position is changed by varying thicknesses of material, is to automatically control the needle thread underneath the material.

In the operation of my device, the thread guide 106 carried by the needle lever moves up and down relative to the thread guide 113, and as the thread guide 106 moves downward, the thread being gripped by the thread clamp 105, said thread guide 106 will take up the slack in the thread and exert a certain pull thereon. The amount of slack which will be taken up by the thread guide 106 is determined by the distance which said guide moves below a line passing through the thread guide 113 and over the thread roll 104. If, therefore, the thread guide 113 is lowered by the increase in thickness of the material passing under the presser foot, the amount of slack taken up by the thread guide 106 will be less; and, on the other hand, when said thread guide 113 is raised by a decrease in the thickness of the material passing underneath the presser foot, the amount of slack taken up by the thread guide 106 will be greater. The thread after it leaves the thread guide 113, passes between the thread finger 120, and the thread roll 121 to the thread guide 122 at the upper end of the needle bar, and thence down along the front of the machine, underneath the thread finger 123 to the needle. As the needle bar moves downward, the thread is brought into contact with the thread finger 120, and as the needle bar moves upward, the thread is brought into contact with the thread roll 121.

It will be noted from Fig. 1, that the thread guide 113 is so adjusted that when the machine is operating upon thin layers of fabric, the guide 106 in its upward movement does not move above a line passing through said thread guide 113, and over the thread roller 104. That is to say, the movements of the thread guide 106 are entirely take up and slack-giving movements. When, however, the fabric passing beneath the presser foot increases in thickness, the presser foot is lifted, and the guide 113 lowered, so that the guide 106 moves to a position above the guide 113, and this movement of the guide 106 above a line passing through the thread guide 113 and over the roller 104, serves as a pull-off movement, supplementing the pull-off movement of the needle bar as it reaches the end of its upward stroke. It will be seen that this supplemental pull-off movement, together with the pull-off movement of the needle bar, constitute means for pulling varying amounts of thread from the supply, according to the thickness of the fabric operated upon. This main pull-off means which is automatically controlled by the position of the presser foot, is entirely independent of the thread-pulling finger 76, which in a sense is a supplemental pull-off member.

The thread finger 76, when the machine is operating upon a single thickness of material, is so positioned relative to the thread rolls 79 and 86, that little or no thread is pulled from the supply. When, however, the thickness of fabric increases the thread roll 86 will be moved to the left, as shown in Fig. 1, and a certain amount of thread pulled from the supply. When this thread finger 76 is operating to pull thread, as above noted, the thread clamp 107 is closed, so that said thread finger will not steal thread from the needle. The sole object of this supplemental pull-off is to pull off a certain amount of thread which is supplied to the needle at or about the time the eye of the needle is part way through the material on its upward stroke, thus giving to the needle a slight amount of extra thread which will allow the eye of the needle to be raised entirely above the surface of the material before the setting of the stitch.

In operating upon leather and similar materials, it is very essential to so control the thread that the stitch may be set after the eye of the needle is clear of the material, for when the eye of the needle is in the material, or beneath the same, considerable resistance to the setting of the stitch is caused by the friction of the thread, which is crowded against the material.

The operation of the various parts of my machine is as follows, when operating upon a single thickness of fabric: Starting with the needle bar at its extreme upper position, as shown in Fig. 1, and the needle thread is at this time taut, as the needle bar is pulling thread from the supply, when it reaches the upper end of its stroke. As the needle bar moves downward, the thread guide 122 is moved toward the thread roll 121, and the thread is, therefore, immediately released from all strain and allowed to remain entirely slack. The thread guide 106, however, is moved away from the thread guide 113, and a portion of the slack in the thread is taken up by this movement. A portion of the slack given to the thread is also taken up by the feeding of the material. At or about the time the eye of the needle reaches the fabric, the lug 110 on the needle lever engages the thread clamp, and closes the same, thereby tightly gripping the thread in the thread clamp, from this time until the needle is again in the same position on its upward stroke. After the needle has well entered the loop of thread carried by the looper, the loop of needle thread of the previous stitch which surrounded the looper is shed therefrom by the backward movement of said looper. The slack in the thread given up by the downward movement of the needle bar, has now been entirely taken up. The needle after the eye thereof enters the material doubles the thread upon itself, and thread must be given thereto to allow the same to move to the full depth of its stroke. A portion of the thread necessary for the movement of the needle into and beneath the material, is taken from the slack given up by the needle bar in its downward movement, but at about the time the loop is shed from the looper as above noted, the slack given up by the needle bar has been consumed, and the further movement of the needle downward draws up the previous needle loop close to the under side of the material, where it will be entirely out of the way of the movements of the looper, and also be positioned properly for the final setting. As the needle rises, the thread again is released of all strain, and the needle throws out its loop for the entrance of the looper. After the looper has entered the needle loop, the needle thread is, of course, held thereby, and the needle slides up the needle thread. The upward movement of the needle bar brings the needle thread into contact with the thread roll 121, and a further movement of the needle bar upward takes up the slack which has been given up by the upward movement of the thread guide 106, and first draws the previous stitch tight, and then draws thread from the supply for the next stitch.

The thread guide 113 is so adjusted that in the movements of the parts above stated, when operating upon a single thickness of material, that the eye of the needle is on top of the material when the stitch setting pull of the needle bar occurs. When the eye of the needle reaches the position just referred to, the thread clamp 107 is released, and the slack drawn up by the thread finger 76, (if any be drawn when working on a single thickness of fabric,) is given up at this point. This slack given up to the needle should be just sufficient to allow the eye of the needle to reach the upper surface of the material when the stitch-setting pull occurs.

Let us suppose the machine now to be operating upon a plurality of thicknesses of fabric. The presser foot is lifted, thus throwing the thread guide 113 downward to a position shown in Fig. 6, and the movements of the thread guide 106 now extend upward beyond the thread guide 113. The presser foot also by its raised position shifts the thread roll 86 so that an increased amount of thread is drawn from the supply by the thread finger 76. This increase in the thickness of the material, of course, consumes a greater amount of thread in forming the stitches. As the needle bar descends, the eye thereof will reach the surface of the material sooner, when operating upon a plurality of thicknesses of material, than when operating upon a single thickness, and, likewise the eye of the needle will leave the material later than when operating upon a single thickness of material. In order that sufficient thread may be given to the needle, so that the same may move to the extreme lower position, the movement of the thread finger 113 downward by the increase in thickness of material under the presser foot, causes the thread guide 106 to take up less slack as the movements of the thread guide 106 below the thread guide 113 is a less distance. This extra slack given up to the needle allows the same to move to the full depth of stroke without cutting through the thread. The position of the thread guide 113 varies, of course, for the different thicknesses of material, and consequently the amount of slack thread given up by the thread guide 113 correspondingly varies. This thread guide 113 may be said to control the thread beneath the material. As the needle rises, the thread is drawn into contact with the thread roll 121, and the thread is drawn taut. With the thread guides adjusted normally for operating upon a single thickness of fabric or material, the thread would be drawn taut, and the needle bar begin its pull upon the thread to set the stitch at or about the time the eye of the needle reaches the surface of the first or lower layer of material, and when there are a plurality of layers, while the eye is still in the material. The thread clamp is, however, opened at or about the time the eye of the needle is partially through the material, and the slack thread which has been drawn off by the thread finger 76 is given up to the needle, and allows the eye thereof to be placed on top of the material before the thread is drawn taut to set the stitch. It will be evident, therefore, that the sole purpose of this auxiliary pull-off or thread finger 76 is to supply thread to the needle, so as to allow the eye thereof to reach the upper surface of the material before the thread would be placed under sufficient strain to set the stitch. The movement of the thread guide 113 downward, so that the thread guide 106 moves above the same, provides an automatic means for pulling an extra amount of thread from the supply, which is necessary for forming the stitch upon the increased thickness of material. This movement of the thread guide 106, together with the pull of the needle bar, constitutes automatic means for pulling thread from the supply, according to the thickness of the material operated upon. The operation of the parts for succeeding stitches will be obvious, and if the material decreases in thickness, the thread guide 113 and the thread roller 86, will assume the proper position, so that the necessary amount of thread is supplied for the formation of the stitch only, and the necessary amount of thread for the movements of the needle beneath the material is also supplied. This control of the needle thread is extremely important, when operating upon leather or other materials which are inelastic, and in which it is desired to make a tight stitch. The parts may be adjusted so as to make a tight stitch upon a single thickness of the material, and without other adjustment the machine will automatically adapt itself for any number of thicknesses making a stitch which is practically of the same degree of tightness.

It is obvious that many minor changes in the details of construction, and the arrangement of parts, may be made, without departing from the spirit of my invention.

Having thus described my invention, what I claim as new and desire to secure by Letters Patent, is:—

1. A sewing machine including in combination, an eye-pointed needle, a loop-taker coöperating therewith, means for pulling thread from the supply, and separate positively actuated means for controlling the needle loop beneath the material, said means including devices for varying the amount of thread given to the needle for forming the needle loop beneath the material according to the thickness of the material.

2. A sewing machine including in combination, an eye-pointed needle, a loop-taker coöperating therewith, means for automatically pulling varying amounts of thread from the supply corresponding to varying thicknesses of material operated upon, and separate means for controlling the needle loop beneath the material, said last named means including positively-actuated devices for automatically varying the amount of thread given to the needle for forming the needle loop beneath the material according to the thickness of the material.

3. A sewing machine including in combination, an eye-pointed needle, a loop-taker coöperating therewith, means for pulling thread from the supply, and separate means for controlling the needle loop beneath the material, said last named means including positively actuated devices for varying the amount of thread given to the needle for forming the needle loop beneath the material according to the thickness of the material, and an auxiliary means for pulling the thread from the supply.

4. A sewing machine, including in combination a needle, a loop taker coöperating therewith, automatic means for pulling thread from the supply for varying thicknesses of material, means for controlling the needle thread loop beneath the material, and auxiliary means for pulling thread from the supply during the downward movement of the needle; substantially as described.

5. A sewing machine including in combination, an eye-pointed needle, a loop-taker coöperating therewith, means for automatically pulling varying amounts of thread from the supply corresponding to varying thicknesses of material operated upon, means for controlling the needle loop beneath the material, said means including devices for automatically varying the amount of thread given to the needle for forming the needle loop beneath the material according to the thickness of the material, and a thread clamp for clamping the thread substantially while the needle eye is beneath the material.

6. A sewing machine including in combination, a needle, a loop-taker coöperating therewith, means for pulling thread from the supply, means for drawing up the needle loops beneath the material on the down stroke of the needle, and automatic means for controlling said last named means for varying thicknesses of material, and automatic means for varying the amount of thread given to the needle for forming the needle loop beneath the material according to the thickness of the material.

7. A sewing machine, including in combination a needle, a loop taker coöperating therewith, means for pulling thread from the supply, automatic means for controlling the amount of thread pulled from the supply for varying thicknesses of material, and means for varying the amount of thread given to the needle for forming the needle loop beneath the material, according to the thickness of the material, and automatic means for supplying the needle with thread to allow the needle eye to clear the material before the stitch-setting operation; substantially as described.

8. A sewing machine including in combination, a needle, a loop-taker coöperating therewith, means for pulling thread from the supply, and means independent of the pulling-off means for varying the amount of thread given to the needle for regulating the needle loop beneath the material.

9. A sewing machine, including in combination a needle, a loop taker coöperating therewith, means for pulling thread from the supply, automatic means for controlling the amount of thread pulled from the supply for varying thicknesses of material, means for pulling up the needle loops beneath the material, and means for automatically controlling said needle loop pulling means for varying thicknesses of material, said means for varying the amount of thread given to the needle for regulating the needle loop beneath the material being independent of the means for pulling thread from the supply; substantially as described.

10. A sewing machine including in combination a needle, a loop taker coöperating therewith, means for pulling thread from the supply, automatic means for controlling the amount of thread pulled from the supply for varying thicknesses of material, means for pulling up the needle loops beneath the material, means for automatically controlling said needle loop-pulling means for varying thicknesses of material, and a thread clamp for clamping the thread while the needle loops are being drawn up beneath the material, said means for varying the amount of thread given to the needle for regulating the needle loop beneath the material being independent of the means for pulling thread from the supply; substantially as described.

11. A sewing machine, including in combination an eye pointed needle, a loop taker coöperating therewith, means for pulling thread from the supply, means for drawing up the needle loops close to the under surface of the material, and independent means for finally setting the stitch; substantially as described.

12. A sewing machine, including in combination a needle, a loop taker coöperating therewith, means for pulling thread from the supply, means for drawing up the needle loops beneath the material, automatic means for controlling said needle loop pulling means for varying thicknesses of material, and independent means for finally setting the stitch; substantially as described.

13. A sewing machine including in combination a needle, a loop taker coöperating therewith, means for pulling up the needle loops underneath the material, a thread clamp coöperating therewith and independent means for finally setting the stitch; substantially as described.

14. A sewing machine including in combination a needle, a loop taker, coöperating therewith, means for pulling up the needle loop beneath the material, a thread clamp coöperating therewith, means for pulling thread from the supply and independent means for finally setting the stitch; substantially as described.

15. A sewing machine including in combination a needle, a loop taker coöperating therewith, means for pulling up the needle loop beneath the material, automatic means for controlling said needle loop pulling means for varying thicknesses of material, a thread clamp coöperating therewith, means for pulling thread from the supply and independent means for finally setting the stitch; substantially as described.

16. A sewing machine including in combination a needle, a loop taker coöperating therewith, means for pulling up the needle loops beneath the material, a thread clamp coöperating therewith, means for pulling the thread from the supply, automatic means for controlling the amount of thread pulled from the supply for varying thicknesses of material, and independent means for finally setting the stitch; substantially as described.

17. A sewing machine including in combination a needle, a loop taker coöperating therewith, means for pulling up the needle loops beneath the material, automatic means for controlling the pulling up of the needle loops for different thicknesses of material, a thread clamp coöperating therewith, means for pulling thread from the supply, automatic means for controlling the amount of thread pulled from the supply for varying thicknesses of material, and independent means for finally setting the stitch; substantially as described.

18. A sewing machine including in combination a needle, a loop taker coöperating therewith, means for pulling thread from the supply, independent means for drawing up the needle loops beneath the material and common means for automatically controlling the amount of thread pulled from the supply and the mechanism for pulling up the needle loops for varying thicknesses of material; substantially as described.

19. A sewing machine including in combination a work support, a presser foot coöperating therewith, a presser bar for supporting said presser foot, a needle and a loop taker coöperating therewith, means for pulling up the needle loops beneath the material on the down stroke of the needle, means for pulling thread from the supply, and means operated from the presser bar for controlling the means for pulling up the needle loops beneath the material; substantially as described.

20. A sewing machine including in combination a work support, a presser foot coöperating therewith, a presser bar for supporting said presser foot, a needle and a loop taker coöperating therewith, means for pulling up the needle loops beneath the material on the downward movement of the needle, means for pulling thread from the supply and means operated from the presser bar for controlling the amount of thread pulled from the supply for varying thicknesses of material; substantially as described.

21. A sewing machine, including in combination a work support, a presser foot coöperating therewith, a presser bar for supporting said presser foot, a needle and a loop taker coöperating therewith, means for pulling up the needle loops beneath the material, means operated from the presser bar for controlling the means for pulling up the needle loop for varying thicknesses of material, a thread clamp coöperating therewith, and means for pulling thread from the supply; substantially as described.

22. A sewing machine, including in combination a work support, a presser foot coöperating therewith, a presser bar for supporting said presser foot, a needle and a loop taker coöperating therewith, means for pulling up the needle loops beneath the material, a thread clamp coöperating therewith, means for pulling thread from the supply, and means operated from the presser bar for controlling said thread-pulling means for varying thicknesses of material; substantially as described.

23. A sewing machine, including in combination a needle, a loop taker, mechanism for setting the stitch, and automatic means independent of the mechanism for setting the stitch for controlling the thread whereby said stitch-setting mechanism will set the stitch after the eye of the needle leaves the material; substantially as described.

24. A sewing machine, including in combination a needle, a loop taker, and means for pulling thread from the supply, comprising a movable thread-engaging finger, thread rolls coöperating therewith, and automatic means for varying the position of one of said rolls for varying thicknesses of the material; substantially as described.

25. A sewing machine, including in combination a needle, a loop taker, and means for pulling thread from the supply, comprising a movable thread-engaging finger, a stationary thread roll, and a movable thread roll, and automatic means for varying the position of the movable thread roll for varying thicknesses of fabric; substantially as described.

26. A sewing machine, including in combination a needle, a loop taker, and means for pulling thread from the supply, comprising a movable thread finger, a stationary thread roll located at one side of said thread finger, and a movable thread roll located at the other side of said thread finger, and means for varying the position of said movable thread roll for varying thicknesses of fabric; substantially as described.

27. A sewing machine, including in combination a work support, a presser foot, a presser bar carrying said presser foot, and means for pulling thread from the supply, comprising a movable thread finger, thread rolls coöperating therewith, and means for varying the position of one of said thread rolls from the movements of the presser bar for varying thicknesses of material; substantially as described.

28. A sewing machine, including in combination, a work support, a presser foot, a presser bar carrying said presser foot, and means for pulling thread from the supply, comprising a movable thread finger, a stationary thread roll located at one side of said finger, a movable thread roll, located at the other side of said thread finger, and means for connecting said movable thread roll to the presser bar; substantially as described.

29. A sewing machine, including in combination a work support, a needle, a needle lever for operating said needle, and means for pulling thread from the supply, comprising a thread-engaging arm secured to said needle lever, and thread rolls coöperating therewith; substantially as described.

30. A sewing machine including in combination, a work support, a needle, a needle lever for operating said needle, and means for pulling thread from the supply, comprising a thread-engaging arm carried by said needle lever, thread rolls coöperating with said thread arm, and means for varying the position of one of said thread rolls for varying thicknesses of fabric; substantially as described.

31. A sewing machine including in combination, a work support, a needle, a needle lever for operating said needle, and means for pulling thread from the supply, comprising a thread arm carried by said needle lever, a stationary thread roll, and a movable thread roll coöperating with said thread arm, and means for varying the position of said movable thread roll for varying thicknesses of fabric; substantially as described.

32. A sewing machine including in combination, a work support, a presser foot, a presser bar carrying said presser foot, a needle, and a needle lever for operating the same, of means for pulling thread from the supply, comprising a thread arm carried by said needle lever, thread rolls coöperating with said thread arm, and means connected to said presser bar for varying the position of one of said thread rolls; substantially as described.

33. A sewing machine including in combination, a work support, a presser foot, a presser bar carrying said presser foot, a needle, and a needle lever for operating the same, of means for pulling thread from the supply, comprising a thread arm carried by said needle lever, a stationary thread roll, and a movable thread roll coöperating with said thread arm, and means connected to the presser bar for varying the position of the movable thread roll; substantially as described.

34. A sewing machine including in combination, a needle, means for operating said needle, a presser foot, a presser bar carrying said presser foot, and a thread-pulling mechanism comprising a thread-engaging arm, thread rolls coöperating therewith, a rock lever connected with said presser bar, and a link connecting said rock lever with one of said thread rolls, whereby the position of said thread roll may be varied; substantially as described.

35. A sewing machine including in combination, a work support, a presser foot, a presser bar carrying said presser foot, a needle, and means for pulling thread from the supply, comprising a thread arm, means for moving the same, thread rolls coöperating with said thread arm, a rock lever, means for connecting one arm of said rock lever to the presser bar, a link having right and left hand screw threads for connecting said rock lever to one of said thread rolls, whereby the position of said thread roll may be varied; substantially as described.

36. A sewing machine including in combination, a work support, a presser foot, a presser bar carrying said presser foot, a needle, and means for pulling thread from the supply, comprising a thread arm, means for moving said thread arm, thread rolls coöperating with said thread arm, a rock shaft having one arm thereof in engagement with the upper end of the presser bar and the other end of said rock shaft being connected to one of said thread rolls; substantially as described.

37. A sewing machine including in combination, a work support, a presser foot, a presser bar carrying said presser foot, a needle, and means for pulling thread from the supply, comprising a thread arm, means for moving said thread arm, thread rolls coöperating with said thread arm, a rock shaft having one arm thereof in engagement with the upper end of the presser bar and the other end of said rock shaft being connected to one of said thread rolls, and a spring for retaining said rock shaft in contact with said presser bar; substantially as described.

38. A sewing machine including in combination, a work support, a presser foot, a presser bar carrying said presser foot, a needle, and means for pulling thread from the supply, comprising a thread arm, means for moving said thread arm, thread rolls coöperating with said thread arm, a rock shaft having one arm thereof in engagement with the upper end of the presser bar and the other end of said rock shaft being connected to one of said thread rolls, an arm carried by said rock shaft, and a spring engaging said arm for holding the rock shaft in engagement with the presser bar; substantially as described.

39. A sewing machine including in combination, a work support, an overhanging arm, a presser bar mounted in said overhanging arm, a presser foot carried thereby, a thread-controlling mechanism comprising a thread-engaging arm, means for moving said thread-engaging arm, a bracket carried by said overhanging arm, thread rolls coöperating with said thread arm and carried by said bracket, and means for connecting one of said thread rolls to the presser bar; substantially as described.

40. A sewing machine including in combination, a work support, an overhanging arm, a presser bar mounted in said overhanging arm, a presser foot carried thereby, a thread-controlling mechanism comprising a thread-engaging arm, means for moving said thread-engaging arm, a bracket carried by said overhanging arm, thread rolls coöperating with said thread arm and carried by said bracket, a rock shaft carried by the head of the machine and engaging the presser bar, and a link for connecting said rock shaft to one of said thread rolls; substantially as described.

41. A sewing machine including in combination, a work support, a presser foot, a presser bar carrying said presser foot, a needle, and means for pulling thread from the supply, comprising a thread-controlling arm, a bracket carried by the head of the machine, a stationary thread roll carried by said bracket, a member pivoted to said bracket and carrying a thread roll, and means connected with the presser bar for varying the position of the thread roll; substantially as described.

42. A sewing machine including in combination, a work support, a presser foot, a presser bar carrying said presser foot, a needle, and means for pulling thread from the supply, comprising a thread-engaging arm, a bracket carried by the head of the machine, a yoke pivoted to said bracket, a thread roll carried by said bracket and extending through a slot in one member of said yoke, a thread roll carried by said yoke, and means for varying the position of the yoke for varying thicknesses of fabric; substantially as described.

43. A sewing machine including in combination, a work support, a presser foot, a presser bar carrying said presser foot, a needle, and means for pulling thread from the supply, comprising a thread-engaging arm, a bracket carried by the head of the machine, a yoke pivoted to said bracket, a thread roll carried by said bracket and extending through a slot in one member of said yoke, a thread roll carried by said yoke, a rock lever carried by the head of the machine, and connected with the presser bar, and means for connecting said rock lever to said yoke; substantially as described.

44. A sewing machine including in combination, a work support, a presser foot, a presser bar carrying said presser foot, a needle, and means for pulling thread from the supply, comprising a thread-engaging arm, a bracket carried by the head of the machine, a yoke pivoted to said bracket, a thread roll carried by said bracket and extending through a slot in one member of said yoke, a thread roll carried by said yoke, a rock lever pivoted to the head of the machine and having one arm thereof in contact with the upper end of the presser bar, and a link for connecting the other arm of said rock lever to said yoke; substantially as described.

45. A sewing machine including in combination, a work support, a presser foot, a presser bar carrying said presser foot, a needle, and means for pulling thread from the supply, comprising a thread-engaging arm, a bracket carried by the head of the machine, a yoke pivoted to said bracket, a thread roll carried by said bracket and extending through a slot in one member of said yoke, a thread roll carried by said yoke, a rock lever pivoted to the head of the machine and having one arm thereof in contact with the upper end of the presser bar, and a link for connecting the other arm of said rock lever to said yoke, and a spring for yieldingly holding the rock shaft in contact with the presser bar; substantially as described.

46. A sewing machine including in combination, a work support, a presser foot, a presser bar carrying said presser foot, a needle, and means for pulling thread from the supply, comprising a thread-engaging arm, a bracket carried by the head of the machine, a yoke pivoted to said bracket, a thread roll carried by said bracket and extending through a slot in one member of said yoke, a thread roll carried by said yoke, a rock lever pivoted to the head of the machine and having one arm thereof in contact with the upper end of the presser bar, and a link for connecting the other arm of said rock lever to said yoke, an arm carried by said rock lever, and a spring for engaging said arm and holding the rock lever in contact with the presser bar; substantially as described.

47. A sewing machine including in combination, a needle, means for operating the needle, a thread clamp for the needle thread, means for adjusting the time of operation of said thread clamp, and means operating upon the thread between said clamp and the needle for varying the amount of thread given to the needle for forming the needle loop beneath the material according to the thickness of the material.

48. A sewing machine including in combination, a needle, a needle lever for operating the same, a thread clamp for the needle thread, means carried by the needle lever for operating said thread clamp and means operating upon the thread between said clamp and the needle for varying the amount of thread given to the needle for forming the needle loop beneath the material according to the thickness of the material; substantially as described.

49. A sewing machine including in combination, a needle, a needle lever for operating the same, a thread clamp for the needle thread, adjustable means carried by the needle lever for operating said thread clamp and means operating upon the thread between said clamp and the needle for varying the amount of thread given to the needle for forming the needle loop beneath the material according to the thickness of the material; substantially as described.

50. A sewing machine including in combination, a needle, a needle lever for operating the same, a thread-controlling arm for varying the amount of thread given to the needle for forming the needle loop beneath the material according to the thickness of the material, a thread guide carried by said needle lever, and located intermediate said thread-controlling arm and the supply; substantially as described.

51. A sewing machine including in combination, a needle, a needle lever for operating the same, a thread-controlling arm for varying the amount of thread given to the needle for forming the needle loop beneath the material according to the thickness of the material, a thread clamp, and a thread guide located intermediate said thread clamp, and said needle loop-controlling means; substantially as described.

52. A sewing machine including in combination, a work support, an overhanging arm, a needle, a needle bar, a needle lever for operating the same, a thread roll carried by the head of the machine adjacent said needle bar, a thread arm pivoted to the head of the machine and carrying a thread guide, a thread guide carried by the needle lever and coöperating with said first named thread guide to position the needle loops beneath the material, and means for pulling thread from the supply; substantially as described.

53. A sewing machine, including in combination a work support, an overhanging arm, a needle, a needle bar, a needle lever for operating the same, a thread roll carried by the head of the machine adjacent said needle bar, a thread arm pivoted to the head of the machine and carrying a thread guide, a thread guide carried by the needle lever and coöperating with said first named thread guide to position the needle loops beneath the material, auxiliary means for pulling thread from the supply, and a thread clamp located between said thread guides and said auxiliary needle thread-pulling means; substantially as described.

54. A sewing machine, including in combination a work support, an overhanging arm, tension disks carried by said overhanging arm, means for drawing thread through said tension disks, and automatic means for controlling the amount of thread drawn through said tension disks for varying thicknesses of fabric, and means for varying the amount of thread given to the needle for forming the needle loops beneath the material according to the thickness of the material.

55. A sewing machine, including in combination a needle, a loop taker, means for pulling thread from the supply, independent means for setting the stitch, and means for controlling the needle thread, so that the stitch is set after the needle is in such position that the eye thereof is above the material being stitched for all thicknesses of material operated upon; substantially as described.

56. A sewing machine, including in combination a needle, a loop taker, automatic means for pulling thread from the supply for varying thicknesses of material, comprising a movable thread-engaging finger, thread rolls coöperating therewith, and means for varying the position of one of said rolls for varying thicknesses of the material; substantially as described.

57. A sewing machine, including in combination a needle, a loop taker, means for pulling thread from the supply for varying thicknesses of material being stitched, upon the ascent of the needle, and auxiliary means for pulling thread from the supply on the descent of the needle and means for clamping the thread during the operation of the auxiliary pulling means; substantially as described.

58. A sewing machine, including a combination a needle, a loop taker, means for pulling thread from the supply, auxiliary means for pulling thread from the supply, said means for pulling thread operating in succession, means operated by the thickness of the material for controlling the amount of thread drawn from the supply; substantially as described.

59. In a sewing machine, a needle and a thread-carrying looper coöperating with said needle to form a chain stitch, means to pull off and take up the thread for the stitch formation, automatic means regulated as the thickness of material varies, for varying the time of taking up the thread to set the stitch at a certain point with respect to the fabric; substantially as described.

60. In a sewing machine, a needle bar, a needle, a loop taker, means to pull thread from the supply as the needle bar ascends, automatic means for pulling off an additional amount of thread, according to the thickness of the material and giving the same up to the needle during the upward movement thereof, and automatic means controlled by the thickness of the material for equalizing the amount of slack thread given to the needle for successive stitches.

61. In a sewing machine, a needle and a loop taker, means to control the supply of thread as the thickness of the fabric under the presser foot varies, automatic means to pull off from the supply thread needed as the thickness of the material to be sewed varies and to give up said thread to the needle on the upward movement of the needle, whereby the stitch may be set as the point of the needle emerges from the material on the upstroke of the needle bar; substantially as described.

62. In a sewing machine, a needle, a needle bar, means for pulling off thread as the needle bar ascends, automatic means for regulating the amount of thread pulled off, automatic means for pulling an additional amount of thread from the supply, and giving the same to the needle on the upward movement of the needle, and automatic means controlled by the thickness of the material for equalizing the amount of slack thread given to the needle for successive stitches.

63. In a sewing machine, a needle, a loop taker, a pull-off device, means for operating the pull-off device, said pull-off device operating to draw a sufficient quantity of thread from the supply and to give slack thread to the needle until the eye of the needle upon its upward stroke is above the material being sewed, before the stitch-setting operation begins, and means for setting the stitch.

64. In a sewing machine, a needle bar and its needle, a constant tension device, and automatic means to draw off thread from the supply as the thickness of the material to be sewed varies, automatic means to clamp the thread during the formation of each stitch, and means operating independently of the drawing off means for regulating the amount of needle thread supplied in the formation of the stitch as the thickness of the material to be sewed varies; substantially as described.

65. In a sewing machine, a needle bar and its needle, a constant tension device, and automatic means to draw off thread from the supply as the thickness of the material to be sewed varies, automatic means to clamp the thread during the formation of each stitch, and means to regulate the amount of needle thread supplied in the formation of the stitch as the thickness of the material to be sewed varies, said clamping means being released to allow free movement of the thread from the supply as the needle bar reaches the top of its stroke; substantially as described.

66. A sewing machine including in combination a needle, a loop taker coöperating therewith, means for drawing thread from the supply on the down stroke of the needle, and independent means for varying the supply of slack thread given to the needle as the thickness of the material varies and during the upward movement of the needle.

67. A sewing machine including in combination, a needle, a loop taker coöperating therewith, positively operated devices for varying the amount of needle thread given up to the needle on the down stroke of the needle in accordance with the thickness of the material operated upon in order to provide said needle with sufficient thread, whereby it may move to the lower end of its stroke without cutting the same, and independent and positively operated devices for supplying a varying amount of thread to the needle on the upward stroke thereof in accordance with the thickness of the material operated upon, whereby the eye of the needle is clear of the material before the needle thread is drawn on to set the stitch, and means operating upon said needle thread to set the stitch.

In testimony whereof I affix my signature, in presence of two witnesses.

RUSSEL G. WOODWARD.

Witnesses:
C. McNEIL,
W. E. WRIGHT.